United States Patent [19]

Cutter

[11] 3,990,630

[45] Nov. 9, 1976

[54] AFTER-HOURS DEPOSITORY ENTRANCE OF THE DRAWER TYPE

[75] Inventor: Larry I. Cutter, Cedar Rapids, Iowa

[73] Assignee: The Walter Kidde & Company, Inc., Clifton, N.J.

[22] Filed: Sept. 3, 1975

[21] Appl. No.: 609,973

[52] U.S. Cl. .................................. 232/44; 232/43.3

[51] Int. Cl.² .......................................... B65G 11/04

[58] Field of Search ................. 232/43.3, 43.4, 43.1, 232/4 D; 109/45, 46

[56] References Cited

UNITED STATES PATENTS

| | | | |
|---|---|---|---|
| 2,842,308 | 7/1958 | Massengill | 232/44 |
| 2,901,165 | 8/1959 | Krug | 232/44 |
| 2,963,333 | 12/1960 | Messtre | 232/44 X |
| 3,059,839 | 10/1962 | Graber | 232/44 |
| 3,465,955 | 9/1969 | DeBoer et al. | 232/44 |

*Primary Examiner*—James T. McCall
*Attorney, Agent, or Firm*—Haven E. Simmons; James C. Nemmers

[57] ABSTRACT

An after-hours depository entrance of the drawer type employs an inclined passageway down through the drawer to receive a deposit. As the drawer is opened the passageway is "intercepted" by means in the drawer to detect any object trapped in the passageway before the drawer is fully open to receive a new deposit. As the drawer is closed, the new deposit is carried rearwardly in the passageway and finally, when the drawer is fully closed, it drops out through the bottom of the drawer into the vault. Two versions of the invention are disclosed, one for envelope deposits in which, as the drawer is opened, any envelope trapped therein is in effect destroyed or the drawer jammed against further opening by the interceptor means. The other version is for bag deposits in which, as the drawer is opened and if there is a bag trapped in it, the interceptor means likewise jams the drawer against further opening. In both versions the action of the interceptor means also frustrates any fishing attempts.

22 Claims, 22 Drawing Figures

FIG 10
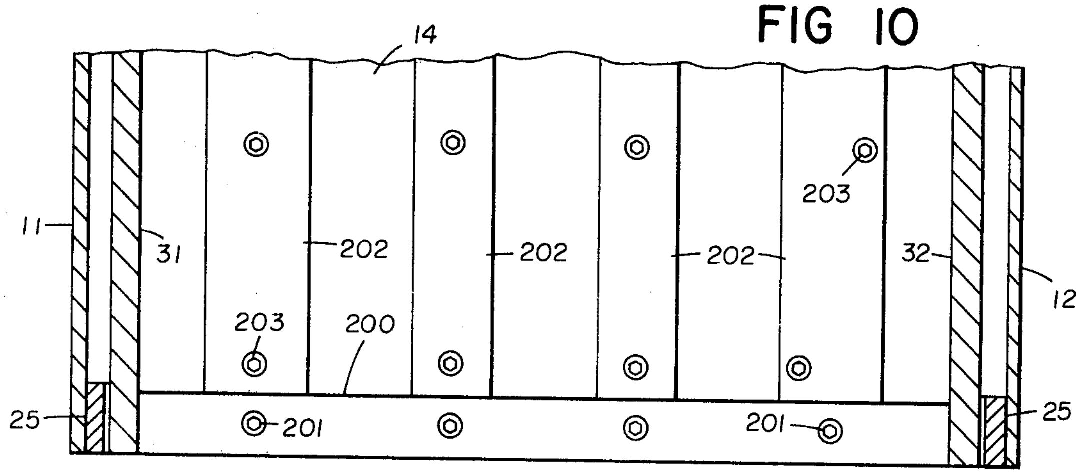
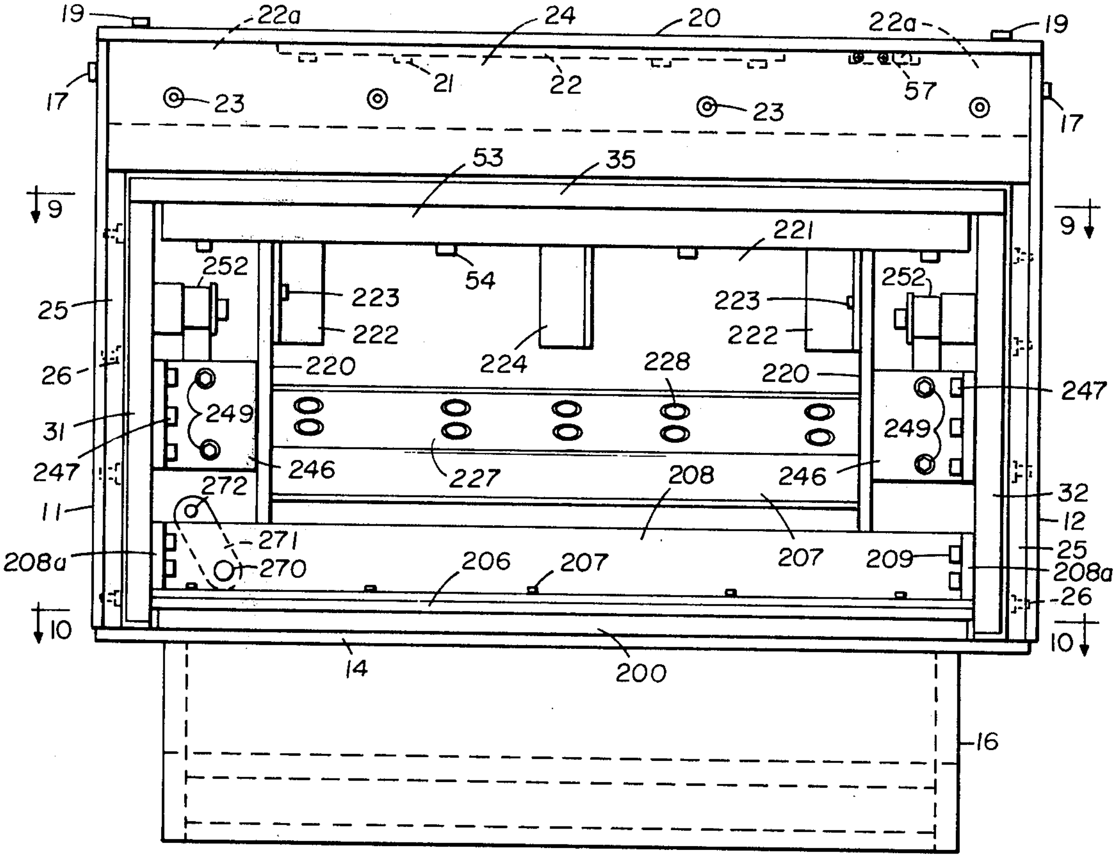
FIG 8

AFTER-HOURS DEPOSITORY ENTRANCE OF THE DRAWER TYPE

BACKGROUND OF THE INVENTION

Drawer type depository entrances are old. Basically the deposit is dropped into the drawer when opened, carried with the drawer as it is closed, and then discharged from the drawer when fully closed through a hinged bottom plate or the like which is permitted to drop down only when the drawer is fully closed. See for example, U.S. Pat. Nos. 1,704,865; 2,465,431; 2,842,308; 2,963,333; and 3,683,826. But security against fishing and trapping has not been easily achieved in the drawer type entrance, at least not without considerable complexity and expense. Nor has its use been extensive, perhaps for these reasons, despite the fact that the drawer type is essentially a relatively simple and direct approach to the matter as well as a "natural" one in the sense that customers are used to opening and closing "drawers" in order to "deposit" things in them. It is the chief object of the present invention, therefore, to provide an after-hours depository entrance of the drawer type which is secure against fishing and trapping and yet is relatively simple in structure and low in cost.

SUMMARY OF THE INVENTION

The invention employs essentially a drawer-like structure which slides in and out of a housing opening through a front closure before which a depositor stands. When the drawer is pulled full out, an entrance in the top of the drawer is presented to the depositor into which he drops his deposit. The top entrance forms the upper end of a rearwardly inclined passage within the drawer large enough to contain the deposit, the latter resting on the bottom wall of the drawer housing which closes the lower end of the passage when the drawer is open. The deposit in the passage is carried rearwardly as the drawer is closed until finally, when the drawer is fully closed, it drops out the passage through an aperture in the drawer housing bottom wall and into the vault. Security against fishing and trapping is provided during the opening movement of the drawer in the following general manner:

In the version of the invention designed specifically for envelope deposits, the passage down through the drawer is formed by a pair of upper and lower castings. The upper casting is slidably mounted in the drawer so that it can move relative to the latter, but is latched at its rear to the drawer housing. As the drawer is pulled open the upper casting remains stationary (owing to the latch) while the lower casting is fixed to and moves forward with the drawer. The two portions of the passage thus move in a close shearing relation to each other until that represented by the upper casting is wholly offset rearwardly from that represented by the lower casting before the deposit entrance in the top of the drawer is exposed forward of the front closure. Fishing attempts are thwarted because they would jam the drawer owing to the fact that further movement of the drawer in order to expose the deposit entrance would be prevented by the latched upper casting. If any envelope were trapped in the passage, the shearing movement of the two castings forming the passage will in effect destroy the envelope or also jam the drawer. Only if the drawer can be opened far enough to completely offset the two passage portions before the deposit entrance emerges from behind the front closure does a release carried by the drawer trip the latch restraining the upper casting. Thereupon a pair of springs attached between the upper casting and the drawer propels the former forward relative to the drawer until the two portions of the passage are once again in alignment to re-open or re-establish the passage so that a deposit can be received into it when the drawer is fully open. When the drawer is thereafter closed, the upper casting is carried back with the drawer as a whole until it is re-engaged by the latch.

In the case of the version of the invention designed for bag deposits, the passage includes front and rear walls which extend the full depth of the passage, the rear wall being fixed to the drawer. The front wall, however, is part of an inner assembly which, like the upper portion of the passage in the envelope version, is also slidably mounted in the drawer for movement relative to the latter in the same direction, but is latched at its rear to the drawer housing. As the drawer is pulled open the front passage wall remains stationary (owing to the latch) while the rear passage wall moves forward until it virtually contacts the front passage wall before the deposit entrance is exposed forward of the front closure and before a release carried by the drawer can trip the latch to allow the drawer to be opened the remainder of the way to expose the deposit opening. Obviously, a bag trapped in the passage or a fishing attempt will make it impossible for the rear passage wall to move close enough to the front wall to trip the latch and hence will jam the drawer against further opening to expose the deposit entrance. If there is no impediment in the passage, then the latch is tripped and a similar pair of springs propels the inner assembly with the front passage wall forward relative to the drawer to re-open or re-establish the passage by the time the deposit entrance is exposed forward of the front wall. Likewise, when the drawer is closed the inner assembly is carried back with the drawer as a whole until it is re-engaged by the latch.

In both versions of the invention, therefore, the passage in the drawer in which a deposit would be trapped or fished is in effect "monitored" by having at least a portion of it "intercepted" before the passage is rendered accessible to a depositor opening the drawer. In each case this is accomplished in turn by "closing off" or "blocking" either a portion of the passage or the entire passage itself. In order to prevent retrieval of a deposit placed in the deposit entrance before the deposit has had a chance to drop out of the drawer housing and into the vault, and to frustrate a fishing attempt through the passage into the vault before the passage can be "monitored" in the foregoing sense, means are provided in both versions barring reopening of the drawer unless it is first substantially fully closed.

The foregoing relationships and sequences will be further clarified in connection with the detailed description which follows and the drawings, from all of which it will be evident that the present invention provides an after-hours depository entrance of the drawer type which is remarkably simple in basic structure and operation, relatively low in cost, and yet more effective in performance and security.

BRIEF DESCRIPTION OF THE DRAWINGS

FIG. 8 is a front elevation view similar to FIG. 1 taken approximately along the line 8—8 of FIG. 9 and illustrating the bag depository of the present invention.

FIG. 10 is a partial section view taken along the line 10—10 of FIG. 8.

DETAILED DESCRIPTION OF THE PREFERRED EMBODIMENTS

Figure 1:
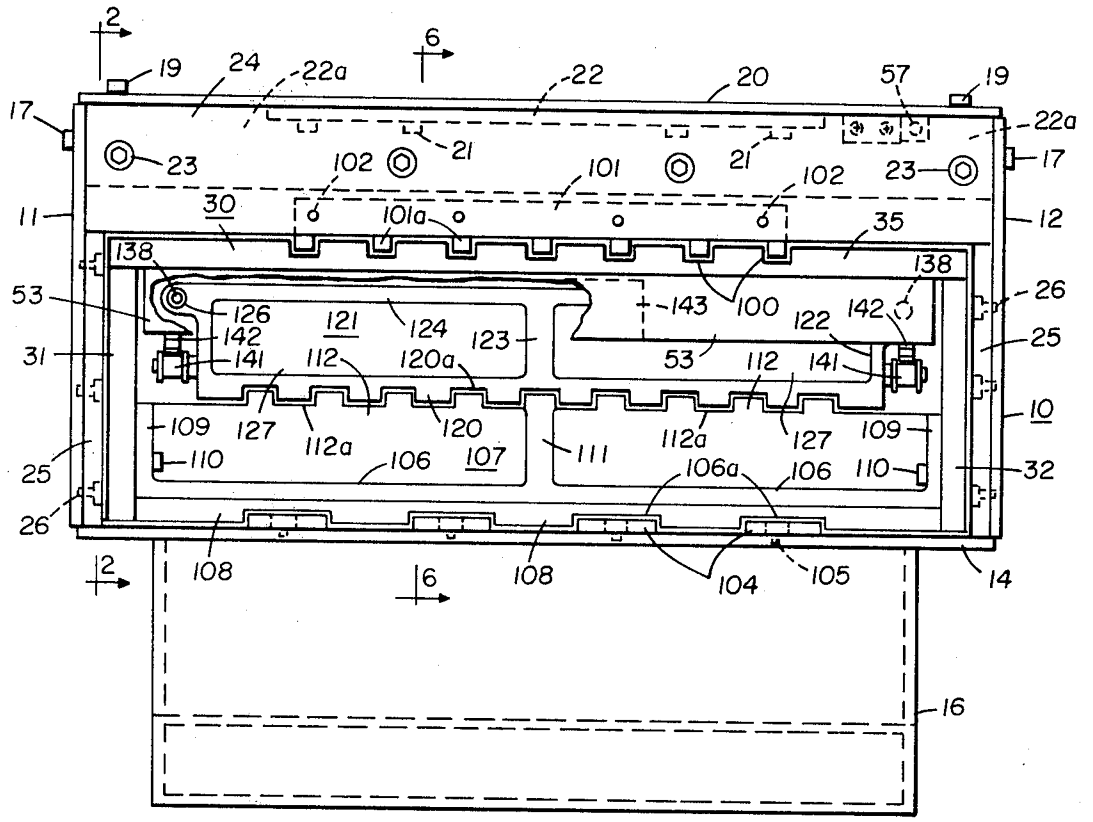
FIG. 1 is a front elevation taken approximately along the line 1—1 of FIG. 2 of the envelope depository of the present invention but with the front closure and drawer front omitted.

Essentially, the drawer housings, the drawers themselves and their suspensions are identical in the cases of both the envelope and bag depositories, the bag depository being somewhat deeper and higher than the envelope depository. The following description will refer first to FIGS. 1 – 7 of the envelope depository, but those components thereof which are identical (except dimension-wise in some cases) in FIGS. 8 – 13 of the bag depository will be given identical numerals. The components which are specific to the envelope version and those which are specific to the bag version will be identified by reference numerals beginning with 100 and 200, respectively.

The Drawer Housing, The Basic Drawer Assembly And The Drawer Suspension

The drawer housing 10 is formed from heavy plate material welded up to form a rectangular, box-like structure with an open top and front having side walls 11 and 12, a rear wall 13 and a bottom wall 14. The latter wall is provided with a rectangular deposit discharge aperture 15 about midway thereback to which is welded a depending rectangular chute 16 which leads to the vault when the depository is installed for use in the usual manner. Along the inner top edges of the side walls 11 and 12 and the rear wall 13 are bolted at 17 angle plates 18 to which is removably bolted at 19 a heavy plate top wall 20. Along the lower face of the front edge of the top wall 20 is bolted at 21 an angle plate whose horizontal portion 22 is of intermediate length but whose vertical portion 22*a* extends laterally to each side wall 11 and 12 and to which is bolted at 23 an upper face plate 24. Below the ends of the latter plate a pair of upstanding bars 25 are bolted at 26 to the forward ends of the side walls 11 and 12. A transverse stop, in the form of a latch plate assembly 27 for purposes to be described, rises from the housing bottom wall 14, to which it is bolted at 28, just to the rear of the discharge aperture 15 and centrally between the side walls 11 and 12. The bars 25, together with the bottom wall 14 and the face plate 24, define a front opening into the housing 10 through which the drawer assembly 30 operates.

Figure 2:
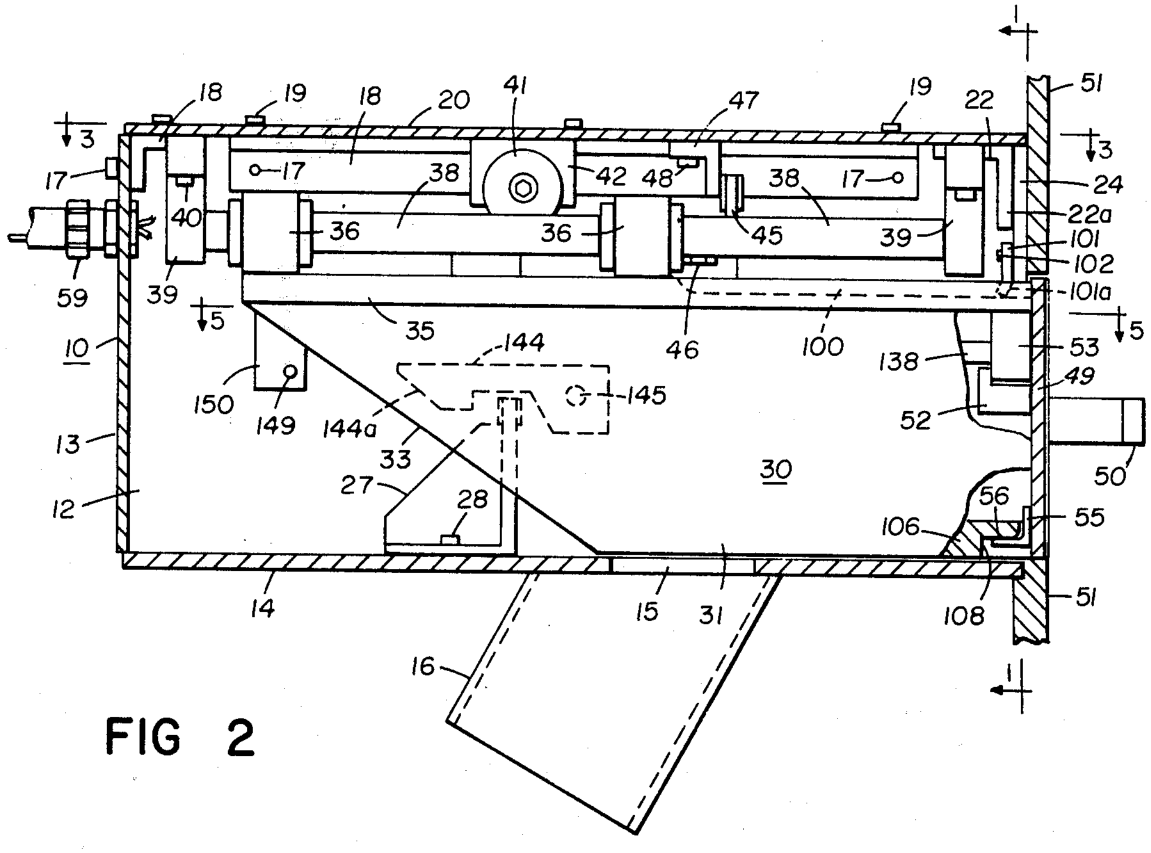
FIG. 2 is a side elevation, partly in section, through the drawer housing taken along the line 2—2 of FIG. 1.
Figure 3:
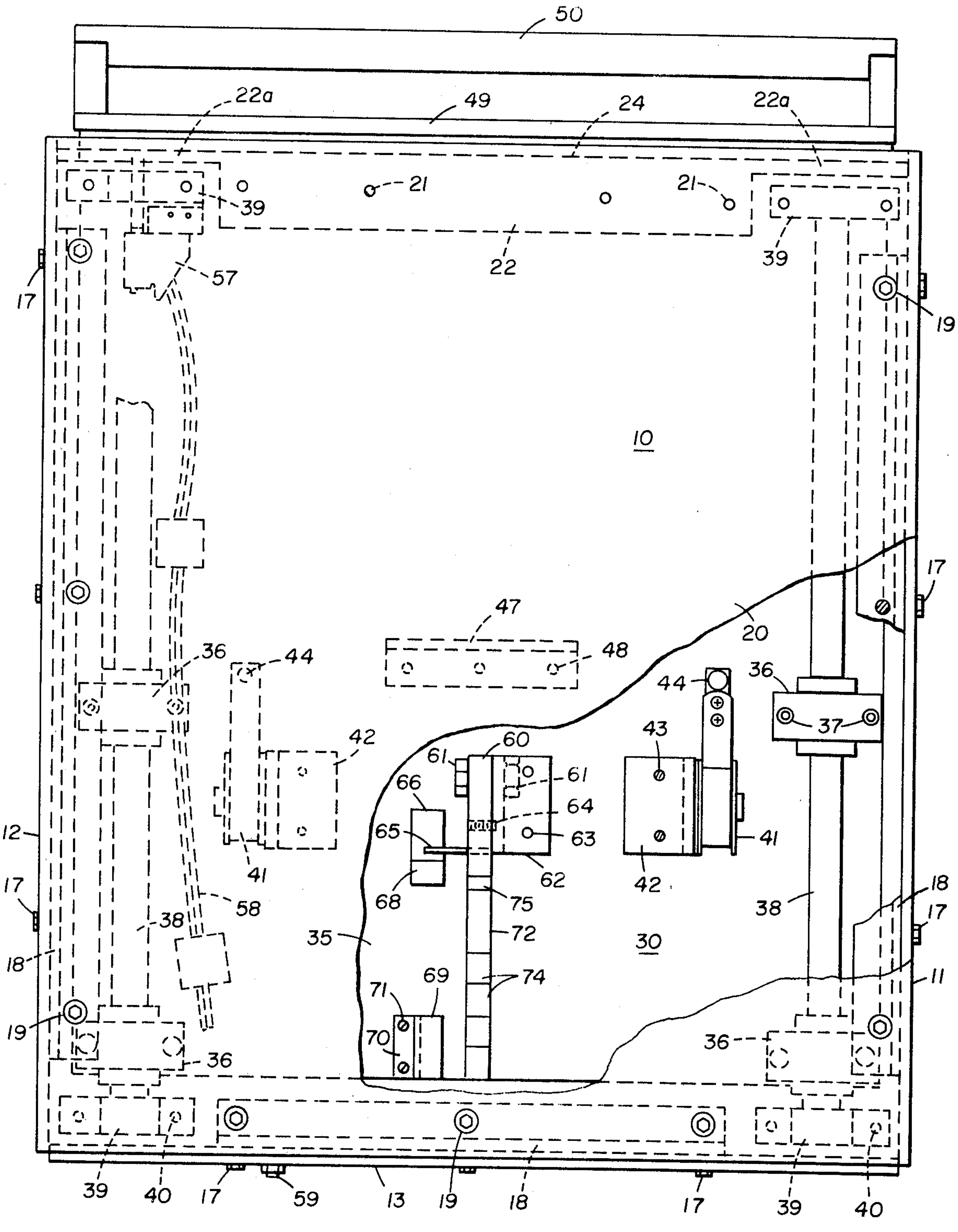
FIG. 3 is a top plan view of the drawer housing taken from the line 3—3 of FIG. 2, certain portions being additionally broken away to illustrate details of the drawer suspension.

The drawer assembly 30 is contained essentially by a body structure consisting of a pair of heavy plate side walls 31 and 32, straddling the latch plate 27 and undercut at 33 at their rear ends, to the top edges of which is bolted at 34 a heavy plate top wall 35. The drawer assembly 30 is slidably mounted in the housing 10 by means of two pairs of linear ball bushings 36, bolted at 37 along the side edges of the top wall 35, which slide on a pair of cylindrical ways 38 secured at their respective ends in two pairs of pillow blocks 39 bolted at 40 to the under face of the housing top wall 20 adjacent its four corners. A pair of laterally spaced Negator type springs 41 biases the drawer assembly 30 to its closed position, the spools of the springs 41 being attached to L-brackets 42 bolted at 43 to the under face of the housing top wall 20 the outer ends of the springs 41 being bolted at 44 to the drawer top wall 35. An upstanding drawer bumper 45, in the form of a transversely extending L-bracket bolted at 46 to the top face of the drawer top wall 35, contacts a depending stop 47, in the form of a similar bracket bolted at 48 to the underface of the housing top wall 20, when the drawer assembly is closed as shown in FIGS. 1 – 3. The bumper 45 also contacts the rear face of the angle plate 22a which acts as a stop when the drawer assembly 30 is opened. The front of the drawer assembly 30 is closed by a face plate 49, provided with a laterally extending handle 50, and is surrounded by the depository entrance front closure, generally indicated at 51. The face plate 49 is secured, first, by lip blocks 52 welded to its rear face which in turn engage the rear face of a heavy cross bar 53 bolted at 54 under the front edge of the drawer top wall 35 and, second, by L-brackets 55, also welded to the rear face of the plate 49, and bolted at 56 in a rabbet along the forward edge of the inner drawer structure to be described (see FIGS. 1, 2 and 5). The operating plunger of a tamper switch 57 engages the rear face of the plate 49 to protect against its removal, the wiring 58 passing back over the drawer top wall 35 and exiting through a fitting 59 in the housing rear wall 13 (see FIGS. 1, 2 and 3).

In order to prevent reopening of the drawer assembly 30 unless it is first fully closed, a pawl 60 (see FIGS. 3 and 6) is pivoted at 61 at its forward end for vertical swinging movement relative to a depending L-bracket 62 bolted at 63 to the underface of the housing top wall 20. Within the pawl 60 is encapsuled a spring loaded ball detent 64 which emerges from one side face of the pawl 60 to engage a seat in the adjacent vertical side face of the bracket 62 in order to maintain the pawl 60 in the elevated position shown in FIG. 6. Toward the rear end of the other face of the pawl 60 a pin 65 extends laterally over the top of an upstanding cam block 66 bolted at 67 to the drawer top wall 35, the block 66 being provided with a rearward sloping cam face 68. As the drawer assembly 30 is opened, the cam block 66 moves forward (to the right in FIGS. 2, 3 and 6) from beneath the pin 65, the detent 64, however, retaining the pawl 60 elevated until, just as the drawer assembly 30 reaches its fully open position, the pin 65 engages a rearwardly sloping cam 69, formed by the underface of the leaf of an offset bracket 70 screwed at 71 to the rear end of the drawer top wall 35. The pawl 60 is thereby dislodged from the detent 64 and drops down upon a rack bar 72 bolted at 73 to the rear of the drawer top wall 35 in alignment with the pawl 60. The rack bar 72 is provided with a succession of sears 74 designed to engage the rear nose 75 of the pawl 60 and halt any effort to reopen the drawer assembly 30 during its reclosing movement. Only when the drawer assembly 30 is substantially fully closed does the cam face 68 of the block 66 engage the pin 65, lifting the pawl 69 until it is retained by the detent 64, and allowing the drawer assembly 30 to be reopened.

The Envelope Depository Drawer And Its Operation

Figure 4:
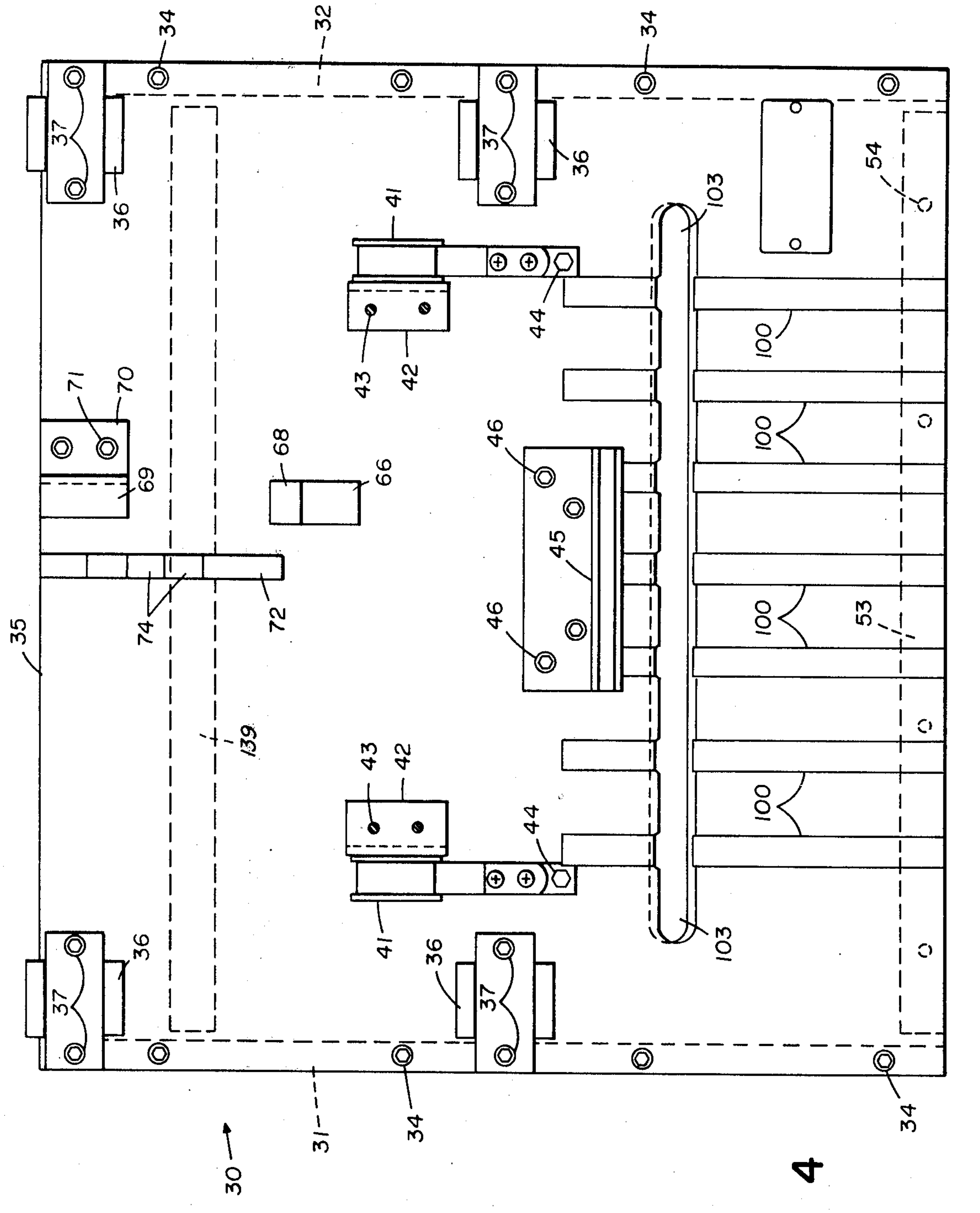
FIG. 4 is a top plan view of the drawer only of the envelope depository.
Figure 5:
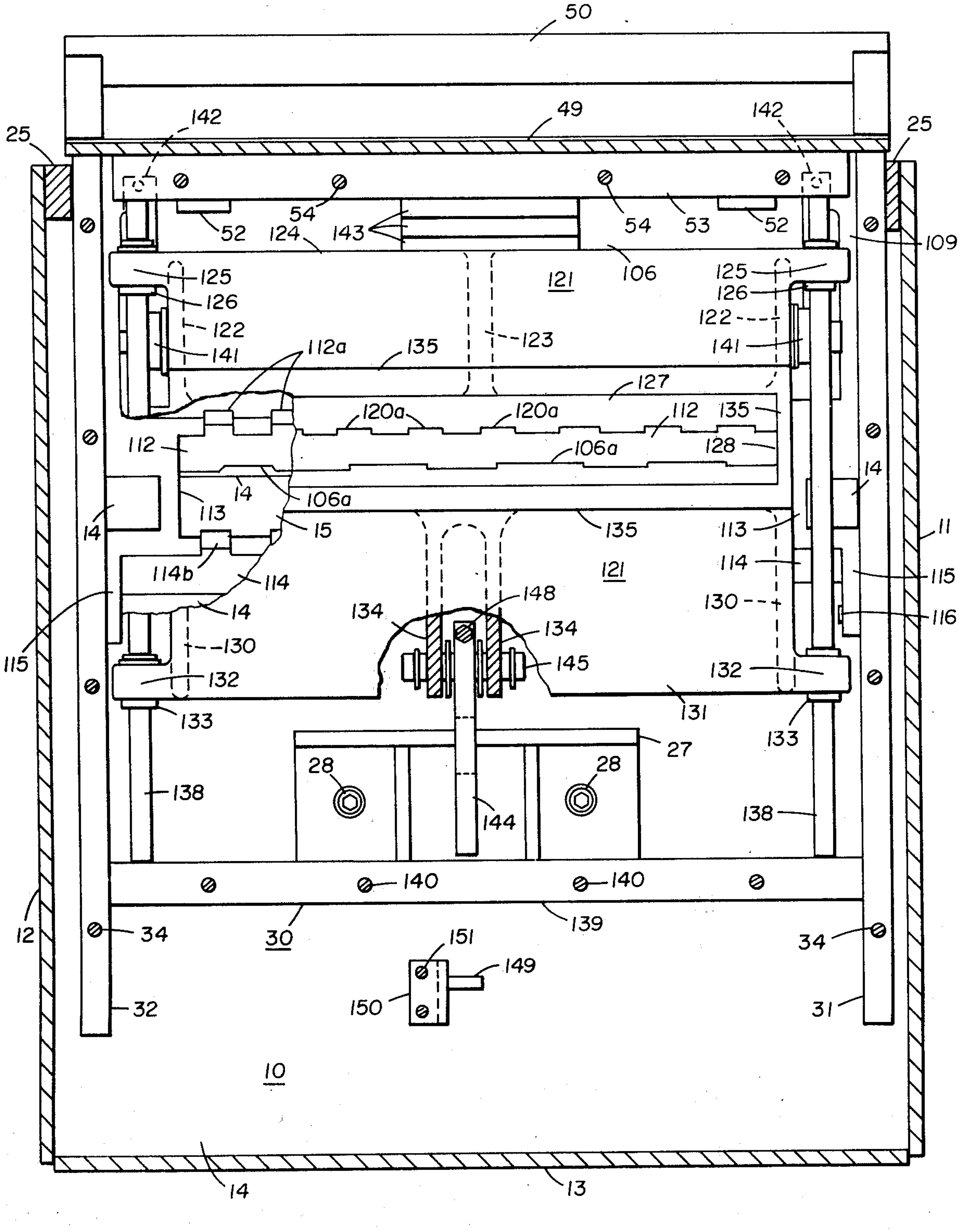
FIG. 5 is a top view of the interior of the drawer of the envelope depository taken along the line 5—5 of FIG. 2.
Figure 6:
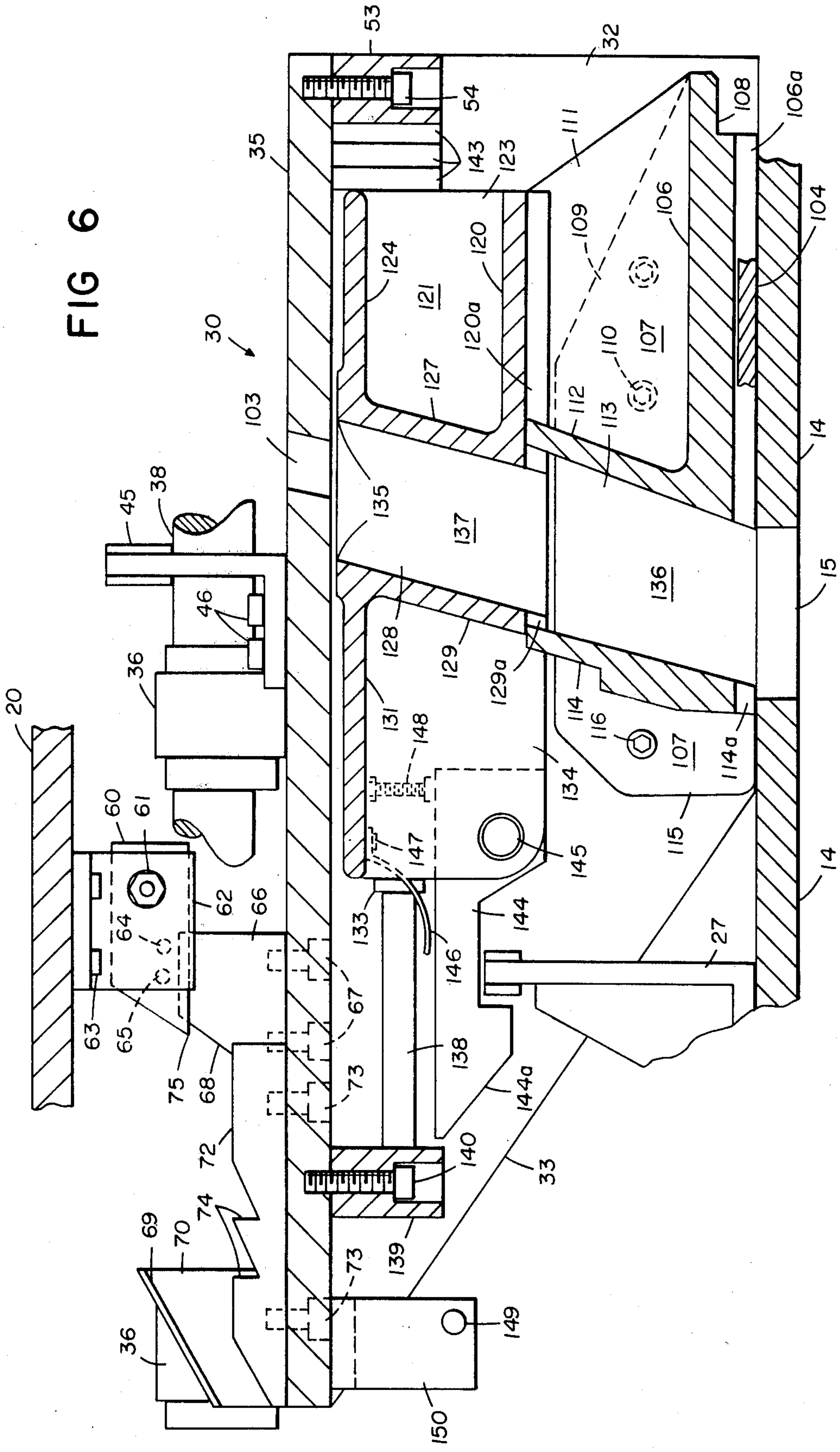
FIG. 6 is an enlarged section view taken approximately along the line 6—6 of FIG. 1 illustrating the essential operating details of the drawer of the envelope depository.
Figure 7A:
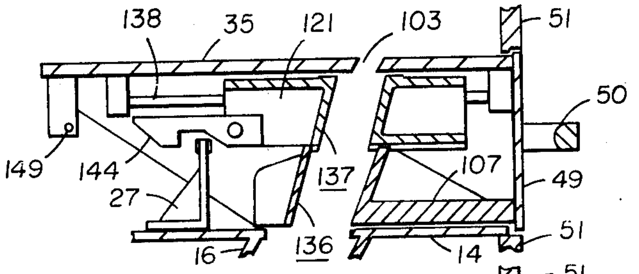
FIGS. 7*a* – 7*f* are somewhat diagrammatic, vertical section views taken longitudinally through the envelope depository and illustrating its operating sequence.
Figure 7B:
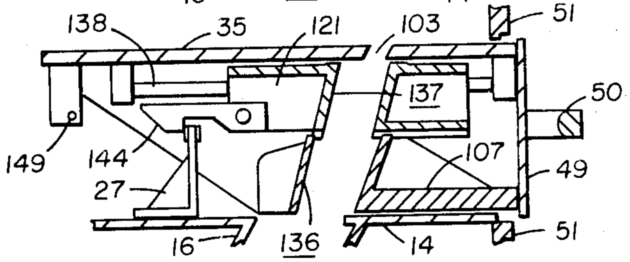
Figure 7C:
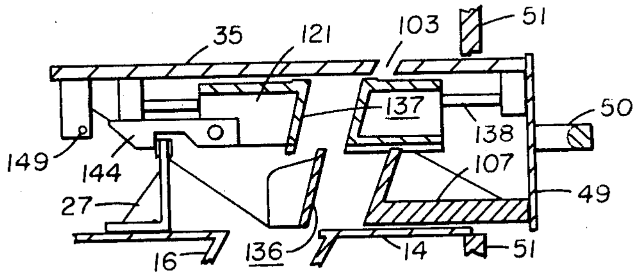
Figure 7D:
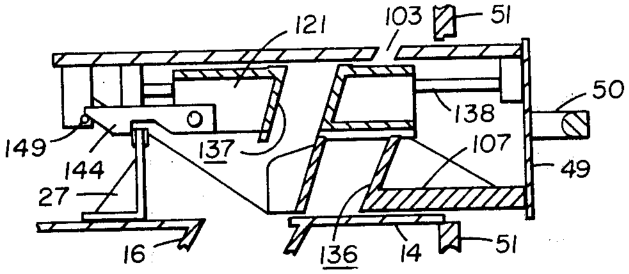
Figure 7E:
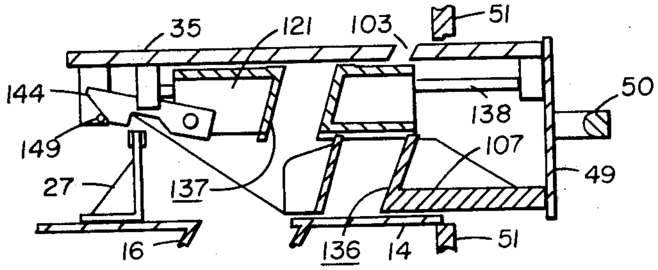
Figure 7F:
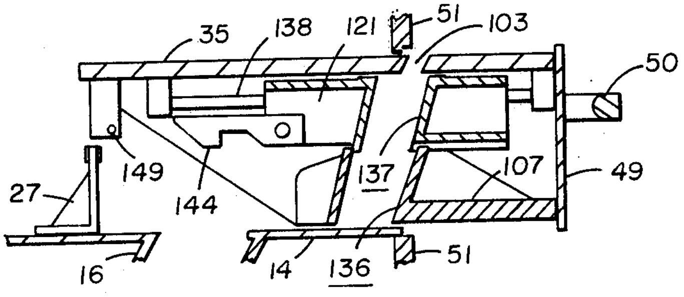

In this version of the invention the drawer top wall 35 is provided with a number of laterally spaced, parallel stripper grooves 100 extending rearwardly from its front edge in which operate the teeth 101a along the lower edge of a stripper bar 101, bolted at 102 to the rear of the housing face plate 24 (see FIGS. 1 and 2), when the drawer assembly 30 is opened and closed. Across the grooves 100 the drawer top wall 35 is provided with a narrow, transverse slot to form an envelope entrance 103 which is somewhat rearwardly inclined as shown in FIGS. 4 and 6 and offset forwardly with respect to the discharge aperture 15 below it when the drawer assembly 30 is closed. Extending back from adjacent the front edge of the housing bottom wall 14 to the forward edge of the discharge opening 15 are a number of flat, laterally spaced, parallel stripper bars 104 bolted to the bottom wall 14 at 105. The bars 104 interlock with a series of ways 106*a* machined in the lower face of the forward bottom wall 106 of an inner drawer lower casting, generally designated at 107. The lower forward edge of the wall 106 also contains the rabbet 108, flush with the forward ends of the bars 104, in which the brackets 55 securing the drawer face plate 49 are bolted at 56. The casting 107 additionally includes a pair of integral end walls 109, bolted at 110 to the inner faces of the drawer side walls 31 and 32, parallel to and between which is an integral rib 111 (see FIGS. 1 and 6). Across the rear of the end walls 109 and rib 111 and adjoining the rear of the bottom wall 106 is an integral lower passage front wall 112 which inclines forwardly up from the front edge of the discharge aperture 15 when the drawer assembly 30 is closed. Integral with the wall 112 but inset from its ends, a pair of webs 113 (see FIG. 5) extend rearwardly along the drawer side walls 31 and 32 and integrally abut a lower passage rear wall 114 generally parallel to the front wall 112. The bottom edge of the wall 114 is machined to provide ways 114a which also interlock with the stripper bars 104 when the drawer assembly 30 is opened and closed. Finally, a pair of ears 115 extend integrally back from the ends of the rear wall 114 and are also bolted at 116 to the drawer side walls 31 and 32. The inner drawer casting 107 is hence a fixed part of and travels with the drawer assembly 30 as a whole. The stripper grooves 100, the stripper bars 101 and 104, and the ways 106*a* and 114*a*, of course, cooperate in the usual fashion to thwart fishing attempts into the vault between the housing 10 and the drawer assembly 30.

The top edges of the lower passage walls 112 and 114 are also machined to provide two sets of aligned ways 112*a* and 114*b* (see FIGS. 1 and 5) which interlock with complementary ways 120*a* machined in the bottom wall 120 of an upper inner drawer casting generally designated at 121. The casting 121 also includes integral ends walls 122, parallel to and between which is an integral rib 123, a top wall 124 whose two forward corners are laterally extended out over the end walls 122 to form bosses 125 in which are fitted linear ball bushings 126, and an upper passage front wall 137 integral with the rear ends of the bottom wall 120, the end walls 122 and the top wall 124. The upper passage front wall 127 also inclines forwardly up from the lower passage front wall 112 and terminates just below and forward of the entrance 103 in the drawer top wall 35. A pair of webs 128 extend rearwardly from the ends of the front wall 127 and join with the ends of an upper passage rear wall 129 which inclines forwardly up from the lower passage rear wall 114 to just below and behind the entrance 103. The lower edges of the rear wall 129 are also provided with machined ways 129*a* which interlock with the ways 112*a* and 114*b* of the lower front and rear passage walls 112 and 114 (see FIGS. 5 and 6). Integral with the rear wall 129 is a pair of rear end walls 130 and a top wall 131 whose rear corners are also laterally extended out over the end walls 130 to form bosses 132 which are fitted with linear ball bushings 133. A pair of closely spaced integral ribs 134 also extend rearwardly beneath the top wall 131 and centrally between the end walls 130. The top edges of the upper passage front and rear walls 127 and 129 and webs 128 are machined flat at 135 to provide an upper mouth for the deposit passage just beneath the entrance 103. The deposit passage therefore comprises a lower passage portion 136 defined by the front and rear walls 112 and 114 and the webs 113 of the lower casting 107 which constitutes a lower sub-assembly fixed in the drawer assembly 30, and an upper passage portion 137 defined by the front and rear walls 127 and 129 and the webs 128 of the upper casting 121 which constitutes an upper sub-assembly, the two castings 107 and 121 in turn constituting an inner drawer assembly which is specific to the envelope verison of the depository.

The upper casting 121 is mounted in the drawer assembly 30 for rearward slidable movement relative thereto and the lower casting 107 on cylindrical ways 138 through the ball bushings 126 and 133, the forward ends of the ways 138 being socketed into the rear of the crossbar 53 and at their rear ends into a crossbar 139 bolted at 140 across the lower face of the drawer top wall 35 adjacent its rear end. The upper casting 121 is biased to a forwardmost position on the ways 138 by a second pair of Negator type springs 141 whose spools are attached to the outer faces of the casting end walls 122 and whose outer spring ends are secured at 142 beneath the crossbar 53 adjacent its ends (see FIGS. 1 and 5). Midway along the rear face of the crossbar 53 a stack of shock absorbent material 143 serves as a bumper for the front edge of the casting top wall 124 (see FIGS. 5 and 6). The upper casting 121 is restrained by a latch bar 144 from moving with the remainder of the drawer assembly 30 when pulled open, the latch bar 144 being provided with an undercut rear nose 144a and pivoted at its front end on a pin 145 between the ribs 134. The latch bar 144 engages the top of the latch plate 27, being urged thereto by a leaf spring 146 attached at 147 to the underside of the casting top wall 131. A screw 148 in the top edge of the latch bar 144 adjusts its position over the latch plate 27 (see FIGS. 5 and 6).

As the drawer assembly 30 opens, therefore, the lower passage portion 136 moves forward with it, thus causing the upper passage portion 137 to be increasing offset rearwardly in a close shearing movement with respect to the lower portion 136, as will be observed from FIGS. *7a* – *7c*. The two portions 136 and 137 are finally fully offset from each other before the envelope entrance 103 is forward of the front closure 51, as seen in FIG. *7d*, thereby in effect closing off the upper part of the deposit passage and completely blocking any access to either passage portion 136 or 137 through the entrance 103. At the same time, any envelope trapped in the passage will either be destroyed or will stop further movement of the two portions 136 and 137 relative to each other and so jam any further opening of the drawer assembly 30. The interlocking ways 112*a*, 114*b* and 120*a*, 129*a* also contribute to the foregoing and especially against any fishing efforts through the deposit passage and the entrance 103. Then, not until the two portions 136 and 137 are completely offset from each other, does a pin 149, extending laterally from an L-bracket 150 screwed at 151 beneath the rear end of the drawer top wall 35, cam the nose 144*a* of the latch bar 144 upwardly against the spring 146 to release the upper casting 121, as seen in FIG. *7e*. The springs 141, which have of course been extended by the opening movement of the drawer assembly 30, then propel the upper casting 121 forward relative to the remainder of the drawer assembly 30 until its top wall 124 strikes the bumper 143 in order to re-establish the deposit passage by the time the drawer assembly 30 is fully open and the entrance 103 is outside of the closure 51, as seen in FIG. *7f*. When an envelope is dropped through the entrance 103 into the passage, the bottom wall 14 of the housing 10 serves to close the lower end of the passage and support the envelope therein as it is carried rearwardly while the drawer assembly 30 is being closed, at which time, of course, the upper casting 121 also moves as a unit rearwardly with the lower casting 107. Finally, the envelope drops by gravity out the discharge aperture 15 into the chute 16, the latch plate 27 cams the nose 144*a* of the latch bar 144 up and over the plate 27 to re-latch the upper casting 121, whereupon the depository is ready for a new cycle of operation as shown in FIG. *7a*.

The Bag Depository Drawer And Its Operation

As already noted, the bag depository version of the invention is somewhat longer and deeper than the envelope version, but its housing 10 and the outer portion of its drawer assembly 30 are essentially identical with those of the envelope depository shown in FIGS. 2 and 3. As shown in FIGS. 8, 9, 10, 11 and 12, the structure specific to the bag version includes a flat transverse bar 200 across the forward end of the housing bottom wall 14 to which it is bolted at 201. Behind the bar 200 a series of parallel, laterally spaced stripper bars 202, bolted at 203 to the wall 14, extend rearwardly to the front edge of the discharge aperture 15. The stripper bars 202 interlock with the depending teeth 204*a* along the rear of a transverse stripper bar 204 closely adjacent the front edge of the discharge aperture 15 when the drawer assembly 30 is closed. The bar 204 is secured at its ends to the drawer side walls 31 and 32 adjacent their bottom edges (see FIGS. 9 and 12) and its rear face is castellated, as indicated at 204*b*, for purposes to be described. In a rabbet in the underface of the front edge of the bar 204 is bolted at 205 the rear end of a floor plate 206. The latter plate extends forwardly between the drawer side walls 31 and 32 just above the stripper bars 202 and its forward end is bolted at 207 to the lower face of a transverse angle bar 208 having end walls 208*a* by which it is bolted at 209 to side walls 31 and 32 adjacent their lower front corners (see FIGS. 8 and 12).

Between the lower rear corners of the drawer side walls 31 and 32 extends a transverse bar 210 to which is attached a lip 211*a* on the lower edge of a passage rear wall plate 211. The latter plate inclines upwardly and forwardly to the underface of the drawer top wall 35 to which it is secured by an angle bar 212 welded to the upper end of the plate 211 and bolted at 213 to the wall 35, the sides of the plate 211 being spaced well inboard from the inner faces of the side walls 31 and 32 (see FIGS. 9 and 11). The wall plate 211 is stiffened by an angle bar 214 bolted at 215 across its rear face intermediate its top and bottom. The front face of the wall plate 211 is provided with a number of laterally spaced lengths of rectangular tubing extending the full height thereof and riveted thereto to form a vertical grating 216 on the forward face of the plate 211, the grating 216 being aligned with and having substantially the same depth as the castellations 204*b* on the stripper bar 204 (see FIGS. 9 and 12). Just forward of the upper ends of the grating 216 the drawer top wall 35 is provided with a transverse bag entrance 217 which is rearwardly inclined but located forwardly relative to the discharge aperture 15 below.

Just above the bars 204 and 210 are disposed the lower edges of a pair of spaced side plates 220 extending parallel to the drawer side walls 31 and 32 just outboard of the adjacent side edges of the rear wall plate 211. The side plates 220 extend up to just beneath the drawer top wall 35, just forward of the bag entrance 217 and just rearward of the discharge aperture 15. Adjacent their front ends the side plates 220 are joined by a transverse passage front wall plate 221 which is provided with a forward lip 221a over the stripper bar 204 from whose rear face the plate 221 rises parallel to the rear wall plate 211 to beneath the drawer top wall 35 where it terminates in a rear lip 221b parallel thereto just forward of the entrance 217. To the front face of the plate 221 are welded the rear flanges 222*a* of a pair of gussets 222, the latter extending forward along the side plates 220 and bolted thereto at 223 to secure the plates 220 and 221 to each other. Between the gussets 222 is disposed a similar gusset 224, the three gussets 222 and 224 also being provided with top flanges 222*b* and 224*b* flush with the wall plate lip 221*b* to all of which is welded a rectangular cover plate 225. To the rear face of the front wall plate 221, between the top face of the castellations 204*b* and the underface of the lip 221*b*, are riveted an additional set of square tubing, aligned with the recesses between the rear grating 216, in order also to form a vertical grating 226 on the rear face of the wall plate 221. The latter plate is additionally stiffened by a transverse angle bar 227 bolted at 228 thereto intermediate the top and bottom of its front face. The rear ends of the side plates 220 are joined by a transverse, rearwardly opening angle bar 230 bolted at 231 and 232 to the edges of a pair of mounting blocks 233 bolted in turn at 234 to the inner faces of the side plates 220. Midway along the underside of the bar 230 a pair of closely spaced leaves 235 extend rearwardly toward the latch plate 27.

Figure 9:
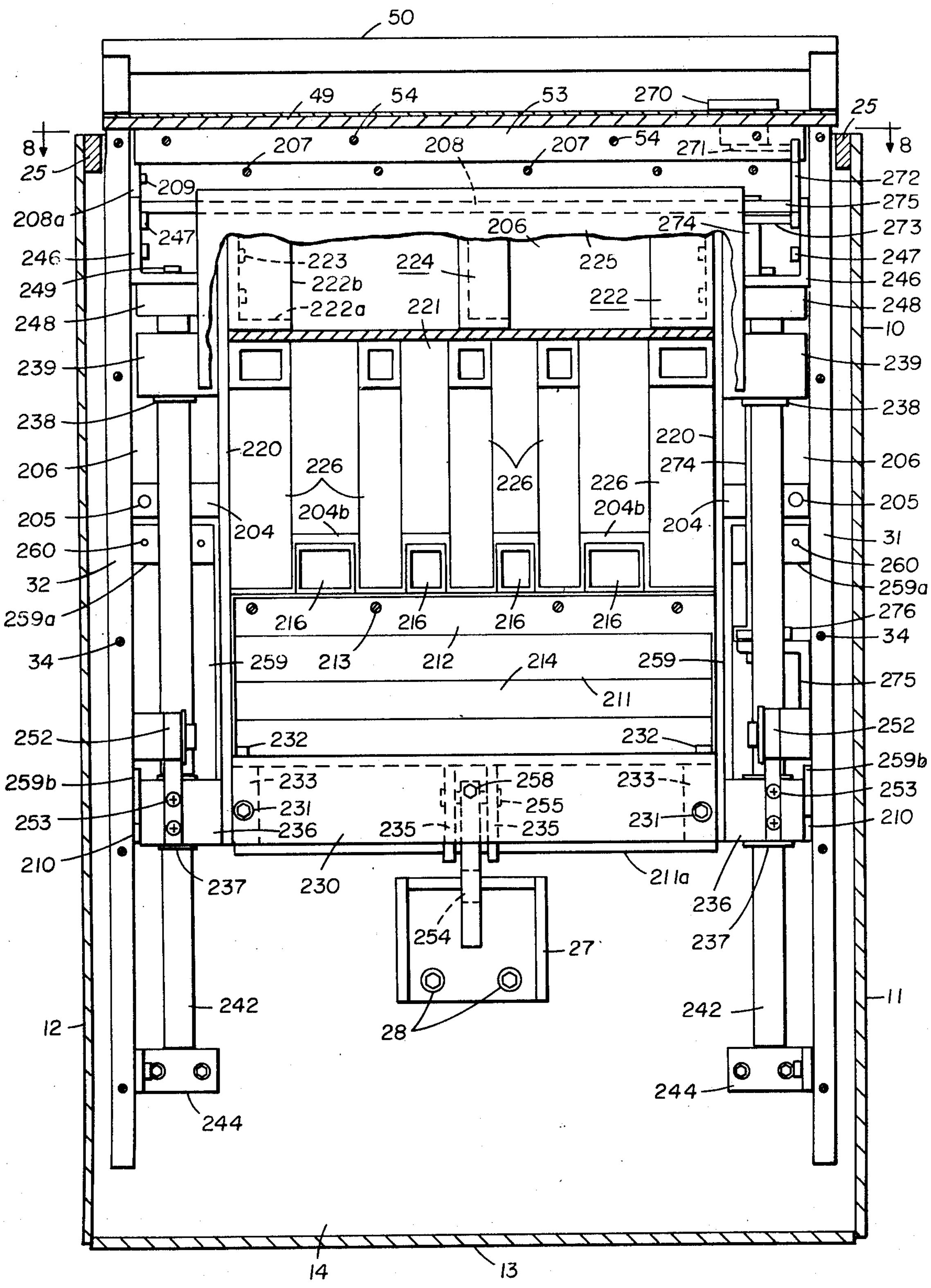
FIG. 9 is a top plan view taken along the line 9—9 of FIG. 8 illustrating the interior of the drawer of the bag depository.
Figure 11:
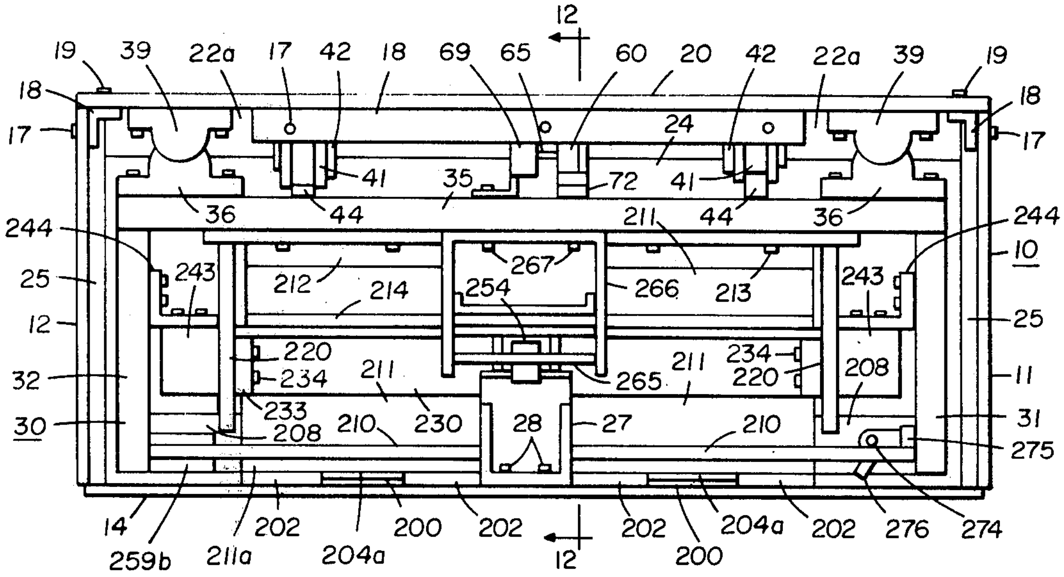
FIG. 11 is an elevation view of the rear end of the bag depository with the back wall of the drawer housing removed.
Figure 12:
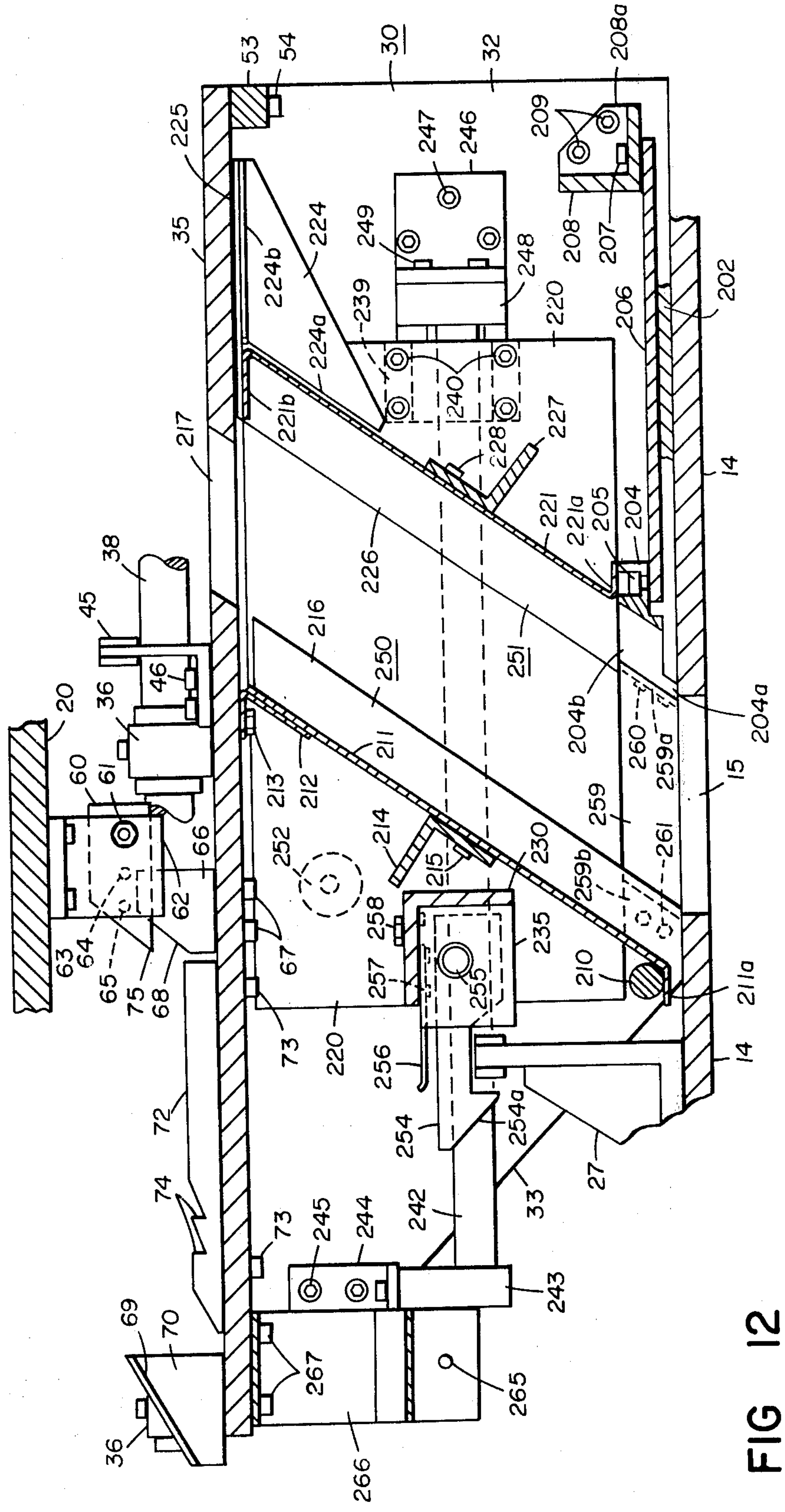
FIG. 12 is an enlarged section view, similar to FIG. 6, taken approximately along the line 12—12 of FIG. 11 and illustrating the essential operating details of the drawer of the bag depository.

The bolts 234 also secure a pair of pillow blocks 236 to the outer faces of the side plates 220 into which are fitted linear ball bushings 237 aligned with similar bushings 238 within like pillow blocks 239 bolted at 240 to the outer faces of the side plates 220 at their forward ends (see FIGS. 9 and 12). The two pairs of bushings 237 and 238 slide on cylindrical ways 242 socketed at their rear ends in end blocks 243 hung from L-brackets 244 bolted at 245 to the inner faces of the drawer side walls 31 and 32. The forward ends of the ways 242 are supported by L-brackets 246, also bolted at 247 to the inner faces of the drawer side walls 31 and 32, whose rear faces are provided with resilient bushings 248 receiving the forward ends of the ways 242 and bolted to the brackets 246 and 249 to act as bumpers against the pillow blocks 239. The stripper bar 204, the floor plate 206 and the passage rear wall plate 211 thus constitute an inner sub-assembly collectively designated at 250 which is a fixed part of the drawer assembly 30, while the side plates 220, the passage front wall plate 221 and the angle bar 230 constitute another inner sub-assembly collectively designated at 251 which straddles the rear wall plate 211 and is slidable relative thereto in the drawer assembly 30 on the ways 242. The two assemblies 250 and 251 in turn constitute an inner drawer assembly which is specific to the bag version of the depository. The deposit passage of the bag depository below the entrance 217 is thus constituted by the stripper bar 204, the sides plates 220, and the rear and front wall plates 211 and 221 and their respective grating 216 and 226.

The sliding assembly 251 is biased to its forwardmost position relative to the fixed assembly 250 by a pair of Negator type springs 252 whose spools are attached to the inboard faces of the drawer side walls 31 and 32 just forward of and above the pillow blocks 236 when the pillow blocks 239 are against the bumpers 248, the outer ends of the springs 252 being attached at 253 to the tops of the pillow blocks 236. The sliding assembly 251 is restrained by a latch bar 254 from moving with the remainder of the drawer assembly 30 when pulled open, the latch bar 254 being provided with an undercut rear nose 254*a* and pivoted at its front end on a pin 255 through the leaves 235 of the angle bar 230. The latch bar 254 engages the top of the latch plate 27, being urged thereto by a leaf spring 256 attached at 257 to the underside of the bar 230. A screw 258 through the top of the latter bar adjusts the position of the latch bar 254 over the latch plate 27 (see FIGS. 9 and 12). The openings between the lower edges of the side plates 220 and the housing bottom wall 14 on the one hand, and between the rear and front wall plates 211 and 221 on the other, are closed by a pair of insert plates 259 (see FIGS. 9 and 12, only one being shown in FIG. 11) having lateral front leaves 259*a,* riveted at 260 to the rear face of the lateral ends of the stripper bar 204, and U-shaped rear ends 259*b* riveted at 261 to the adjacent inboard faces of the side walls 31 and 32.

Figure 13A:
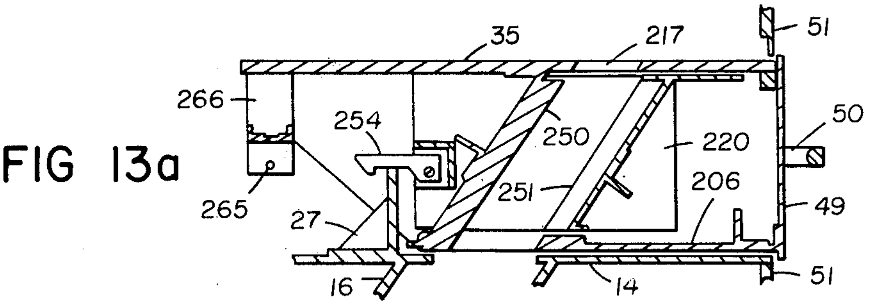
FIGS. 13*a* – 13*e* are somewhat diagrammatic vertical section views, similar to FIGS. 7*a* – 7*f*, taken longitudinally through the bag depository and illustrating its operating sequence.
Figure 13B:
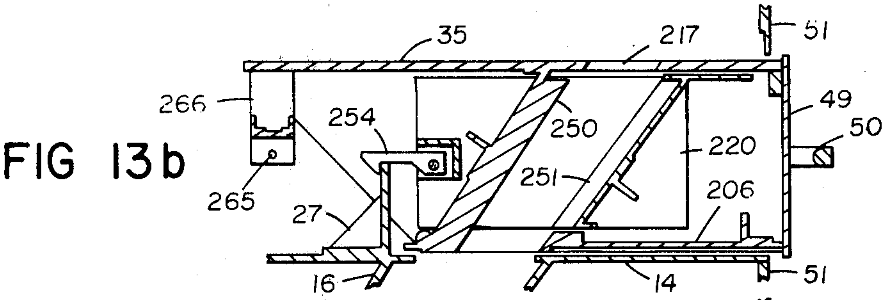
Figure 13C:
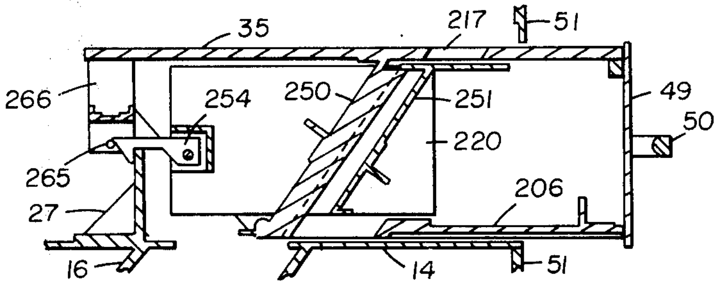
Figure 13D:
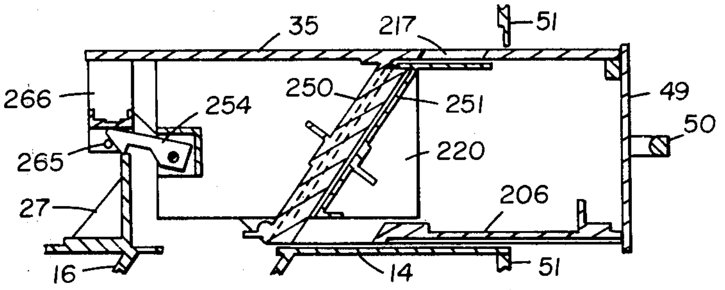
Figure 13E:
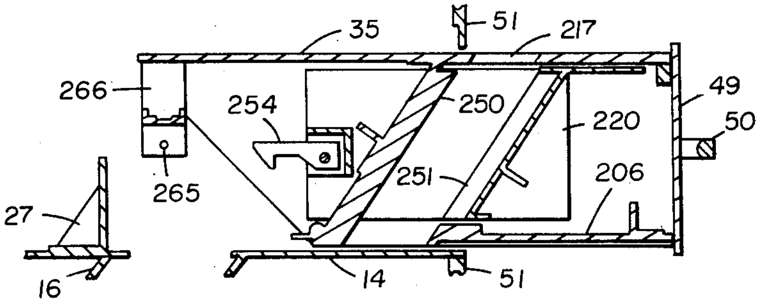

As the drawer assembly 30 opens, therefore, the fixed assembly 250 moves forward with it, thus causing the rear passage wall plate 211 to approach the front passage wall plate 221, as seen in FIGS. 13*a* – 13*c,* until the grated faces to the two wall plates 211 and 221 virtually touch each other, the grating 216 of the former closely interfitting between the grating 226 of the latter and the castellations 204*a* of the stripper bar 204, all before the bag entrance 217 is forward of the front closure 51, as seen in FIG. 13*d.* In effect, the entire deposit passage is thereby closed off and access to it or the discharge aperture 15 through the entrance 217 is completely blocked. If any bag or object is trapped in the passage, it will stop further movement of the wall plate 211 toward the plate 221 and so jam the drawer assembly 30 against further opening. Any fishing attempts are also thwarted in the same manner. Then, not until the grated faces of the two wall plates 211 and 221 are in vitual contact with each other, does a transverse bar 265 between the depending leaves of a bracket 266, screwed at 267 beneath the rear end of the drawer top wall 35, cam the nose 254*a* of the latch bar 254 upwardly against the spring 256 to release the sliding assembly 251, as also seen in FIG. 13*d.* The springs 252, which have of course been extended by the opening movement of the drawer assembly 30, then propel the sliding assembly 251 forward until the latter strikes the bumpers 248 in order to re-establish the deposit passage by the time the drawer assembly 30 is fully open and the entrance 217 is forward of the closure 51, as seen in FIG. 13*e.* When a bag is dropped through the entrance 217 into the passage, the bottom wall 14 of the housing 10 serves to close the lower end of the passage and support the bag therein as it is carried rearwardly while the drawer assembly 30 is being closed, at which time, of course, the sliding assembly 251 also moves rearwardly as a unit with the fixed assembly 250. Finally, the bag drops by gravity out the discharge aperture into the chute 16, the latch plate 27 cams the nose 254*a* of the latch bar 254 up and over the plate 27 to relatch the sliding assembly 251, and the depository is ready for a new cycle of operation as shown in FIG. 13*a.*

In order to allow the bag depository to be locked up, a cylinder lock 270 is located in the lower corner of the face plate 49 adjacent the drawer side wall 31. The rearr of the lock 270 is fitted with a crank arm 271 extending up above the top of the angle bar 208 to which is attached the front end of a pin 272 whose rear end engages the upper end of a second crank arm 273. The lower end of the latter arm is fixed to the forward end of the shaft 274 journaled in spaced L-brackets 275 attached to the inboard face of the side wall 31 adjacent its lower edge. The rear end of the shaft 274 is fitted with a depending pawl 276 (see FIGS. 9 and 11) which, when the shaft 274 is rotated by the lock 270 via the crank arms 271 and 273 and the pin 272, engages a slot (not shown) in the upper face of the housing bottom wall 14 when the drawer assembly 30 is closed in order to prevent it being opened.

Summary

Thus in both versions of the invention the deposit passage is "monitored" before the deposit entrance is forward of the front closure. The monitoring occurs, as will now be evident, during a first portion of movement of the drawer assembly toward its open position and by blocking or closing off in effect either a part or the whole of the passage below the deposit entrance. The passage is then unblocked or reopened during a second portion of the opening movement of the drawer assembly when the deposit entrance emerges from behind the front closure as the drawer assembly reaches its fully open position. Finally, the drawer assembly cannot be re-opened once the deposit entrance has retreated behind the front closure unless and until the deposit passage is again "monitored" , which is to say that the drawer assembly must first traverse the first portion of its opening movement before the deposit entrance is again accessible to a depositor. Stated another way, as the drawer assembly is being closed, once communication is established between the deposit passage and the housing discharge aperture (and hence with the vault) the drawer assembly cannot be re-opened unless and until the passage is "monitored". In the two versions of the invention illustrated this is accomplished by requiring the drawer assembly to be first fully closed before it can be re-opened. Hence, even though the present invention has been described in terms of two specific emebodiments, being the best modes known of carrying out the invention, it is not limited to those embodiments alone. The following claims, therefore, are to be read as encompassing all adaptations and modifications of the invention falling within its scope and spirit.

I claim:

1. In an after-hour depository entrance or the like having a front closure and a drawer assembly, the drawer assembly including a drawer body mounted for movement in opposite first and second directions through an opening in the front closure between an inner closed position and an outer open position, the drawer body having a passage therethrough effective to contain a deposit therein with an upper entrance to receive the deposit and a lower exit to emit the deposit, the passage entrance and exit being both disposed behind the front closure when the drawer body is in its closed position with the passage entrance being exposed for deposit access thereto when the drawer body is in its open position, a deposit introduced into the passage through its entrance when the drawer body is in its open position being carried rearwardly as the drawer body is moved to its closed position and then emitted from the passage exit, the improvement wherein the drawer assembly includes: passage interceptor means, the drawer body and the interceptor means being moved relative to each other upon movement of the drawer body during a first portion of its movement in the first direction toward its open position, the interceptor means during said first portion of movement of the drawer body intercepting the passage intermediate its entrance and exit and any object in the passage before the passage entrance is disposed forward of the front closure for access by a depositor, the interceptor means and the drawer body thereafter being moved relative to each other upon movement of the drawer body during a second portion of its movement in the first direction so that the interceptor means is disposed out of the path of a deposit introducing into the passage when the drawer body has reached its open position; and means to restrain movement of the drawer body toward its open position unless the drawer body has first traversed said first portion of its movement in the first direction.

2. The device of claim 1 wherein the passage interceptor means and the drawer body are both movable relative to each other in the first direction of movement of the drawer body; means to restrain movement of the interceptor means relative to the drawer body during said first portion of the movement of the drawer body in the first direction, the interceptor means during said first portion of the movement of the dr:wer body closing off at least a portion of the passage before its entrance is disposed forward of the front closure; and means to thereafter move the interceptor means in the first direction relative to the drawer body during said second portion of its movement effective to reopen the passage when the drawer body has reached its open position, the interceptor means being thereafter movable together with the drawer body in its second direction of movement from its open to its closed position.

3. The device of claim 2 wherein the drawer assembly includes a stationary housing for the drawer body, the housing opening through the front closure and having a deposit discharge opening in a bottom wall thereof, the discharge opening being disposed rearwardly of the front closure and below the passage exit effective to gravitationally discharge a deposit from the housing when the drawer body is in its closed position, the bottom wall having a portion forwardly of the discharge opening and below the passage exit to form a lower closure for the passage while the drawer body is moved in the second direction with a deposit in the passage; and wherein the drawer body restraining means prevents movement of the drawer body to its open position unless the drawer body is first substantially in its closed position.

4. The device of claim 3 wherein the interceptor restraining means includes latch means carried by the housing and the interceptor means, the latch means being engaged when the drawer body is in its closed position, and means carried by the drawer body to release the latch means after the interceptor means has closed off said portion of the passage as aforesaid.

5. In an after-hour envelope depository entrance or the like having a front closure and a drawer assembly, the drawer assembly including a drawer body mounted for movement in opposite first and second directions through an opening in the front closure between an inner closed position and an outer open position, the drawer body having a passage therethrough effective to contain a deposit therein with an upper entrance to receive the deposit and a lower exit to emit the deposit, the passage entrance and exit being both disposed behind the front closure when the drawer body is in its closed position with the passage entrance only being exposed for deposit access thereto when the drawer body is in its open position, a deposit introduced into the passage through its entrance when the drawer body is in its open position being carried rearwardly as the drawer body is moved to its closed position and then emitted from the passage exit, the improvement wherein the passage includes upper and lower portions defined in upper and lower inner assemblies in close interfitting relation to each other in the drawer body, a first one of the inner assemblies being fixed to the drawer body while the second inner assembly and the drawer body are movable relative to each other in the first direction of movement of the drawer body from its closed to its open position; means to restrain movement of the second inner assembly relative to the drawer body as the drawer body is moved in the first direction so that the second inner assembly blocks off the portion of the passage otherwise provided thereby before the passage entrance is disposed forward of the front closure for access by a depositor; means to thereafter move the second inner assembly in the first direction relative to the drawer body effective to unblock said portion of the passage when the drawer body has reached its open position, the second inner assembly being thereafter movable together with the drawer body in its second direction of movement to its closed position; and means to restrain movement of the drawer body toward its open position unless the drawer body is first substantially in its closed position.

6. The device of claim 5 wherein the drawer assembly includes a stationary housing for the drawer body, the housing opening through the front closure and having a deposit discharge opening in a bottom wall thereof, the discharge opening being disposed rearwardly of the front closure and below the passage exit effective to gravitationally discharge a deposit from the housing when the drawer body is in its closed position, the bottom wall having a portion forwardly of the discharge opening and below the passage exit to form a lower closure for the passage while the drawer body is moved in its second direction with a deposit in the passage.

7. The device of claim 6 wherein the second inner assembly restraining means includes latch means carried by the housing and the second inner assembly, the latch means being engaged when the drawer body is in its closed position, and means carried by the drawer body to release the latch means after second inner assembly has blocked off the portion of the passage otherwise provided by it as aforesaid.

8. The device of claim 6 wherein the first and second inner assemblies each includes spaced front and rear walls in respective abutting relation to each other when the drawer body is in its closed position in order partially to define the upper and lower passage portions, the respective front and rear walls of the two passage portions moving in shearing relation to each other so that one of the passage portions is progressively off-set rearwardly of the other as the drawer body is moved in the first direction.

9. The device of claim 8 wherein the second inner assembly comprises an inner member mounted to the drawer body for slidable movement relative thereto in the first direction of movement of the drawer body, the inner member having said passage portion and walls thereof formed therein and a latch secured to a rearward portion thereof, the latch engaging a latch stop fixed to the housing when the drawer body is in its closed position; means carried by the drawer body to release the latch from the latch stop after the one passage portion is completely off-set from the other, the latch and the latch stop comprising the restraining means; means to propel the inner member in the first direction after the latch has been released from the latch stop; and means to re-engage the latch with the stop when the driver body has been returned in the second direction to its closed position.

10. In an after-hour bag depository entrance or the like having a front closure and a drawer assembly, the drawer assembly including a drawer body mounted for movement in opposite first and second directions through and opening in the front closure between an inner closed position and an outer open position, the drawer body having a passage therethrough effective to contain a deposit therein with an upper entrance to receive the deposit and a lower exit to emit the deposit, the passage entrance and exit being disposed behind the front closure when the drawer body is in its closed position with the passage entrance only being exposed for deposit access thereto when the drawer body is in its open position, a deposit introduced into the passage through its entrance when the drawer body is in its open position being carried rearwardly as the drawer body is moved to its closed position and then emitted from the passage exit, the improvement comprising first and second inner drawer assemblies in and carried by the drawer assembly respectively including rear and front walls defining a portion of the passage, the first inner assembly being fixed to the drawer body while the second inner assembly and the drawer body are movable relative to each other in the first direction of movement of the drawer body from its closed to its open position; means to restrain movement of the second inner assembly relative to the drawer body as the drawer body is moved in the first direction so that the rear passage wall substantially contacts the front passage wall effective to block off the passage otherwise provided thereby before the passage entrance is disposed forward of the front closure for access by a depositor; means to thereafter move the second inner assembly in the first direction relative to the drawer body effective to unblock the passage when the drawer body has reached its open position, the second inner assembly being thereafter movable together with the drawer body in its second direction of movement to its closed position; and means to restrain movement of the drawer body toward its open position unless the drawer body is first substantially in its closed position.

11. The device of claim 10 wherein the drawer assembly includes a stationary housing for the drawer body, the housing opening through the front closure and having a deposit discharge opening in a bottom wall thereof, the discharge opening being disposed rearwardly of the front closure and below the passage exit effective to gravitationally discharge a deposit from the housing when the drawer body is in its closed position, the bottom wall having a portion forwardly of the discharge opening and below the passage exit to form a lower closure for the passage while the drawer body is moved in its second direction with a deposit in the passage.

12. The device of claim 11 wherein the second inner assembly restraining means includes latch means carried by the housing and the second inner assembly, the latch means being engaged when the drawer body is in its closed position, and means carried by the drawer body to release the latch means after second inner assembly has blocked off the portion of the passage otherwise provided by it as aforesaid.

13. In an after-hour depository entrance or the like having a drawer assembly including a drawer body mounted in a drawer housing for movement in opposite first and second directions relative thereto through an opening in the housing between an inner closed position and an outer open position, the drawer body having a passage therethrough partially defined by front and rear walls, the passage being effective to contain a deposit therein and having an upper entrance to receive the deposit and a lower exit to remit the deposit, a deposit introduced into the passage through its entrance when the drawer body is in its open position being carried rearwardly as the drawer body is moved to its closed position and then emitted from the passage exit, the improvement wherein at least a portion of one of the passage walls is movable relative to at least a portion of the other passage wall to effectively close off at least a portion of the passage; means operatively associated with the drawer body to cause movement of said passage wall portion as aforesaid during movement of the drawer body in its first direction of movement toward its open position but before the drawer body has reached its open position, one of the passage wall portions being thereafter moved effective to re-open the passage when the drawer body has reached its open position; and means to restrain movement of the drawer body toward its open position unless said passage portion has been first closed off as aforesaid.

14. The device of claim 13 wherein the drawer housing includes a bottom wall having a deposit discharge opening disposed below the passage exit effective to gravitationally discharge a deposit from the housing when the drawer body is in its closed position, the bottom wall having a portion forwardly of the discharge opening and below the passage exit to form a lower closure for the passage while the drawer body is moved in its second direction with a deposit in the passage; and wherein the drawer body restraining means prevents movement of the drawer body to its open position unless the drawer body is first substantially in its closed position.

15. The device of claim 14 wherein the front and rear passage wall portions are diagonally disposed one above the other.

16. The device of claim 15 including a pair of inner drawer assemblies in stacked relation to each other, the first one of the inner assemblies being fixed within the drawer body, the second one of the inner assemblies being slidable in the drawer body relative thereto in its first direction of movement and in close shearing relation to the first inner assembly, the two inner assemblies having wall portions including said front and rear wall portions defining the deposit passage; means to restrain movement of the second inner assembly relative to the drawer body as the latter is moved in its first direction until said front and rear wall portions of the two inner assemblies at least adjoin each other adjacent their respective upper and lower ends before the drawer body reaches its open position; and means thereafter to cause movement of the second inner assembly relative to the drawer body in its first direction of movement to re-establish the passage when the drawer body has reached its open position, the second inner assembly being thereafter movable together with the drawer body in its second direction of movement.

17. The device of claim 16 wherein the second inner assembly restraining means includes latch means associated with the housing and the rear of the second inner assembly, the latch means being engaged when the drawer body is in its closed position, and means carried by the drawer body to release the latch means after said adjoinment of the wall portions of the two inner assemblies.

18. The device of claim 14 wherein the front and rear passage wall portions are in opposed facing relation to each other.

19. The device of claim 18 wherein the front passage wall portion and the drawer body are both movable relative to each other in the first direction of movement of the drawer body, the rear passage wall portion being fixed to and movable with the drawer body; means to restrain movement of the front wall portion relative to the drawer body as the drawer body is moved in its first direction unless and until the front wall portion is substantially engaged by the rear wall portion to close off the passage as aforesaid upon movement of the drawer body in its first direction; and means to thereafter move the front wall portion in the first direction relative to the drawer body effective to re-open the passage when the drawer body has reached its open position, the front wall portion being thereafter movable together with the drawer body and the rear wall portion in the second direction of movement of the drawer body.

20. The device of claim 19 wherein the front wall portion restraining means includes latch means associated with the housing and the passage front wall, the latch means being engaged when the drawer body is in its closed position, and means carried by the drawer body to release the latch means after the passage rear wall has engaged the passage front wall as aforesaid.

21. The device of claim 19 including an inner assembly comprising the entire passage front wall and a pair of opposite walls forming side walls for the passage, the inner assembly being mounted in the drawer body for slidable movement relative thereto in the first direction of movement of the drawer body; a latch secured to a rearward portion of the inner assembly and engaging a latch stop fixed to the housing when the drawer body is in its closed position; means carried by the drawer body to release the latch from the stop after the inner assembly front wall has been engaged by the entire passage rear wall, the latch and the stop comprising the front wall portion restraining means; means to propel the inner assembly in the first direction after the latch has been released from the stop; and means to reengage the latch with the stop when the drawer body has been returned in the second direction to its closed position.

22. The device of claim 21 wherein the passage front and rear walls include complementary means extending outwardly from the faces thereof toward and interfitting with each other when the two walls are in engagement as aforesaid.

* * * * *